US012700815B2

(12) United States Patent
Gross et al.

(10) Patent No.: US 12,700,815 B2
(45) Date of Patent: Aug. 4, 2026

(54) SYSTEMS AND METHODS FOR GRID FORMING CONTROL

(71) Applicant: Wisconsin Alumni Research Foundation, Madison, WI (US)

(72) Inventors: Dominic Gross, Madison, WI (US); Prajwal Bhagwat, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 818 days.

(21) Appl. No.: 18/181,107

(22) Filed: Mar. 9, 2023

(65) Prior Publication Data

US 2024/0305226 A1 Sep. 12, 2024

(51) Int. Cl.
| | |
|---|---|
| *H02P 9/00* | (2006.01) |
| *H02J 3/38* | (2006.01) |
| *H02J 3/46* | (2006.01) |
| *H02J 101/28* | (2026.01) |

(52) U.S. Cl.
CPC ............. *H02P 9/007* (2013.01); *H02J 3/381* (2013.01); *H02J 3/46* (2013.01); *H02J 2101/28* (2026.01)

(58) Field of Classification Search
CPC ... H02P 9/007; H02J 3/381; H02J 3/40; H02J 2101/28
See application file for complete search history.

(56) References Cited

U.S. PATENT DOCUMENTS 4,251,736 A * 2/1981 Coleman ................... H02J 3/18
307/66
11,671,039 B2 * 6/2023 Shine ...................... H02P 9/007
290/44
(Continued)

OTHER PUBLICATIONS

Avdiaj et al., "A Virtual Synchronous Machine-based Control for Eliminating DC-side Power Oscillations of Three-Phase VSCs under Unbalanced Grid Voltages", 2021 IEEE 15th International Conference on Compatibility, Power Electronics and Power Engineering (CPE-Powereng) DOI: 10.1109/CPE-POWERENG50821.2021.9501184, downloaded Nov. 29, 2023.
(Continued)

*Primary Examiner* — Gary L Laxton
(74) *Attorney, Agent, or Firm* — Andrus Intellectual Property Law, LLP

(57) ABSTRACT
Systems, methods, and media for grid forming control having balancing feedback across the phases are provided. The grid forming control can include phasor determination configured to, for each of the plurality of phases, receive a frequency reference and determine an active and reactive power for the phase based on an electrical measurement for the phase and the frequency reference, GFM control configured to, for each of the plurality of phases, determine the frequency reference based on the active power for the phase and balancing feedback across the plurality of phases and determine a voltage magnitude reference for the phase based on the reactive power for the phase and balancing feedback across the plurality of phases, and a control loop configured to, for each of the plurality of phases, determine a control signal for a power converter based on the determined voltage magnitude reference for the phase.

20 Claims, 6 Drawing Sheets

(56) References Cited

U.S. PATENT DOCUMENTS

| | | | | |
|---|---|---|---|---|
| 2007/0055408 | A1* | 3/2007 | Delmerico | H02J 3/06 |
| | | | | 700/286 |
| 2007/0108771 | A1* | 5/2007 | Jones | H02P 9/102 |
| | | | | 290/44 |
| 2012/0292904 | A1* | 11/2012 | Tarnowski | H02P 9/42 |
| | | | | 290/44 |
| 2022/0090578 | A1* | 3/2022 | Larsen | F03D 9/257 |

OTHER PUBLICATIONS

Awal et al., "Double Synchronous Unified Virtual Oscillator Control for Asymmetrical Fault Ride-Through in Grid-Forming Voltage Source Converters", IEEE Transactions on Power Electronics, vol. 38, No. 6, Jun. 2023.

Baeckeland et al., "On the Distance Protection of Power Grids dominated by Grid-forming Inverters", 2022 IEEE PES Innovative Smart Grid Technologies Conference Europe (ISGT-Europe) DOI: 10.1109/ISGT-Europe54678.2022.9960410.

Baeckeland et al., "Stationary-Frame Grid-Forming Inverter Control Architectures for Unbalanced Fault-Current Limiting", IEEE Transactions on Energy Conversion, vol. 37, No. 4, Dec. 2022.

Bhagwat et al., Reliable fault ride-through and protection of converter-dominated power systems under unbalanced conditions (S-95) Poster, May 2023.

Bhagwat et al., Reliable fault ride-through and protection of converter-dominated power systems under unbalanced conditions (s-95), Dec. 2022, PSERC Poster.

Bhagwat et al., Reliable fault ride-through and protection of converter-dominated power systems under unbalanced conditions (S-95), IAB, Spring 2022, PSERC Poster.

Bhagwat, Reliable fault ride-through and protection of Grid-forming converters, 2022 WEMPEC Annual Review Meeting Poster, May 17-18, 2022.

Chandorkar et al., "Control of Parallel Connected Inverters in Standalone ac Supply Systems", IEEE Transactions on Industry Applications, vol. 29, No. 1, JANUARYIFEBRUAKY 1993.

D'Arco et al., "A Virtual Synchronous Machine implementation for distributedcontrol of power converters in SmartGrids", Electric Power Systems Research 122 (2015) 180-197.

Jia et al., "A Review on Grid-Connected Converter Control for Short-Circuit Power Provision Under Grid Unbalanced Faults", IEEE Transactions On Power Delivery, vol. 33, No. 2, Apr. 2018.

Paquette et al., "Virtual Impedance Current Limiting for Inverters in Microgrids With Synchronous Generators", IEEE Transactions on Industry Applications, vol. 51, No. 2, Mar./Apr. 2015.

Qoria et al., "Current limiting algorithms and transient stability analysis of grid-forming VSCs", Electric Power Systems Research 189 (2020) 106726.

* cited by examiner

510 Measure Phase Signals

520 Estimate Phasors

530 Perform Balancing Feedback

540 Provide References

550 Control Current and Voltage

500

400 Control Unit

410 Processor

420 Memory

430 Operating Routine(s)

SYSTEMS AND METHODS FOR GRID FORMING CONTROL

BACKGROUND

Control strategies for grid-connected power converters can be broadly categorized into grid-forming and grid-following controls. Grid-following control assumes that the grid frequency and voltage magnitude are stable and change slowly and controls the converter as a current/power source relative to the stable grid. Grid-forming control uses power converters to imposes a stable voltage waveform (e.g., frequency and magnitude) at the point of connection and contributes to grid stability. However, by imposing the terminal voltage, grid-forming converters are vulnerable to overcurrent due to grid faults. Existing methods for current limiting of grid-forming converters can, at best, successfully limit the fault current during a balanced fault, but not during unbalanced faults or with severely unbalanced loads. Existing grid-forming control, which provides a voltage reference to the power converter or its inner controls, is limited to providing a balanced voltage reference.

Accordingly, improved systems, methods, and media for improved grid-forming control are desirable.

SUMMARY

In accordance with some embodiments of the disclosed subject matter, systems, methods, and media for grid forming control are provided.

According to some aspects of the present disclosure, a grid forming control system for a power converter having a plurality of phases is provided. The system can include a phasor determination unit configured to, for each of the plurality of phases, receive a frequency reference for the phase and determine voltage and current phasors as well as an active power and a reactive power for the phase based on an electrical measurement for the phase and the frequency reference for the phase, a GFM controller configured to, for each of the plurality of phases, determine the frequency reference for the phase based on the active power for the phase and balancing feedback across the plurality of phases and determine a voltage magnitude reference for the phase based on the reactive power for the phase and balancing feedback across the plurality of phases, and a control loop configured to, for each of the plurality of phases, determine a control signal for the power converter based on the determined voltage magnitude reference for the phase.

According to some aspects of the present disclosure, a method for controlling a power converter (e.g., voltage source converter) having a plurality of phases is provided. The method can include, for each of the plurality of phases: receiving a frequency reference for the phase, determining an active power and a reactive power for the phase based on an electrical measurement for the phase and the frequency reference for the phase, determining a voltage magnitude reference for the phase based on the reactive power for the phase and balancing feedback across the plurality of phases, determining the frequency reference for the phase based on the active power for the phase and balancing feedback across the plurality of phases, and determining a control signal for the power converter based on the determined voltage magnitude reference for the phase.

BRIEF DESCRIPTION OF THE DRAWINGS

The present disclosure will hereafter be described with reference to the accompanying drawings, wherein like reference numerals denote like elements.

DETAILED DESCRIPTION

In accordance with some embodiments of the disclosed subject matter, systems, methods, and media for a grid forming controller are provided. In particular, novel systems and methods are introduced to solve unbalanced fault ride-through challenges, with a fault response that can reliably trip standard protective devices. Advantageously, systems and methods according to various embodiments of the present disclosure may provide an unbalanced voltage during an unbalanced fault or severely unbalanced load to control its current injection. Systems and methods according to various embodiments may maintain sinusoidal current and voltage waveforms with no or minimal distortion during a fault and after clearing the fault.

A grid-forming (GFM) converter according to various aspects of the present disclosure may comprise a grid-forming control (GFM control) and a multi-phase power converter, such as a voltage source converter (VSC) or current source inverter, treated as separate individual single-phase power converters. In some embodiments, the power converter may comprise a VSC and each single-phase VSC may have its own grid-forming control (e.g., droop control) with underlying single-phase current and voltage control loops. The VSC may take an input power, such as a direct current (DC) power and modulate it to an output alternating current (AC) waveform based on a modulated voltage reference from the grid-forming control. This allows full control over all degrees of freedom in the appropriate coordinates (e.g., phase quantities) and eliminates delays associated with estimating sequence components. The grid-forming controls may further comprise a phase-balancing feedback configured to synchronize and/or balance the three individual single-phase grid-forming controls when possible, and enable a controlled trade-off between current/power unbalance and voltage unbalance during unbalanced faults or when feeding severely unbalanced load(s). The GFM voltage magnitude references may be tracked by individual inner current and/or voltage controllers for every phase with current limiting. A GFM converter according to the present disclosure may maintain control over the VSC terminal voltage under unbalanced conditions and phase current under unbalanced faults. While the present disclosure exemplifies embodiments for controlling a VSC, other power converter topologies (such as current source inverters) may be controlled as will be described below.

Figure 1:
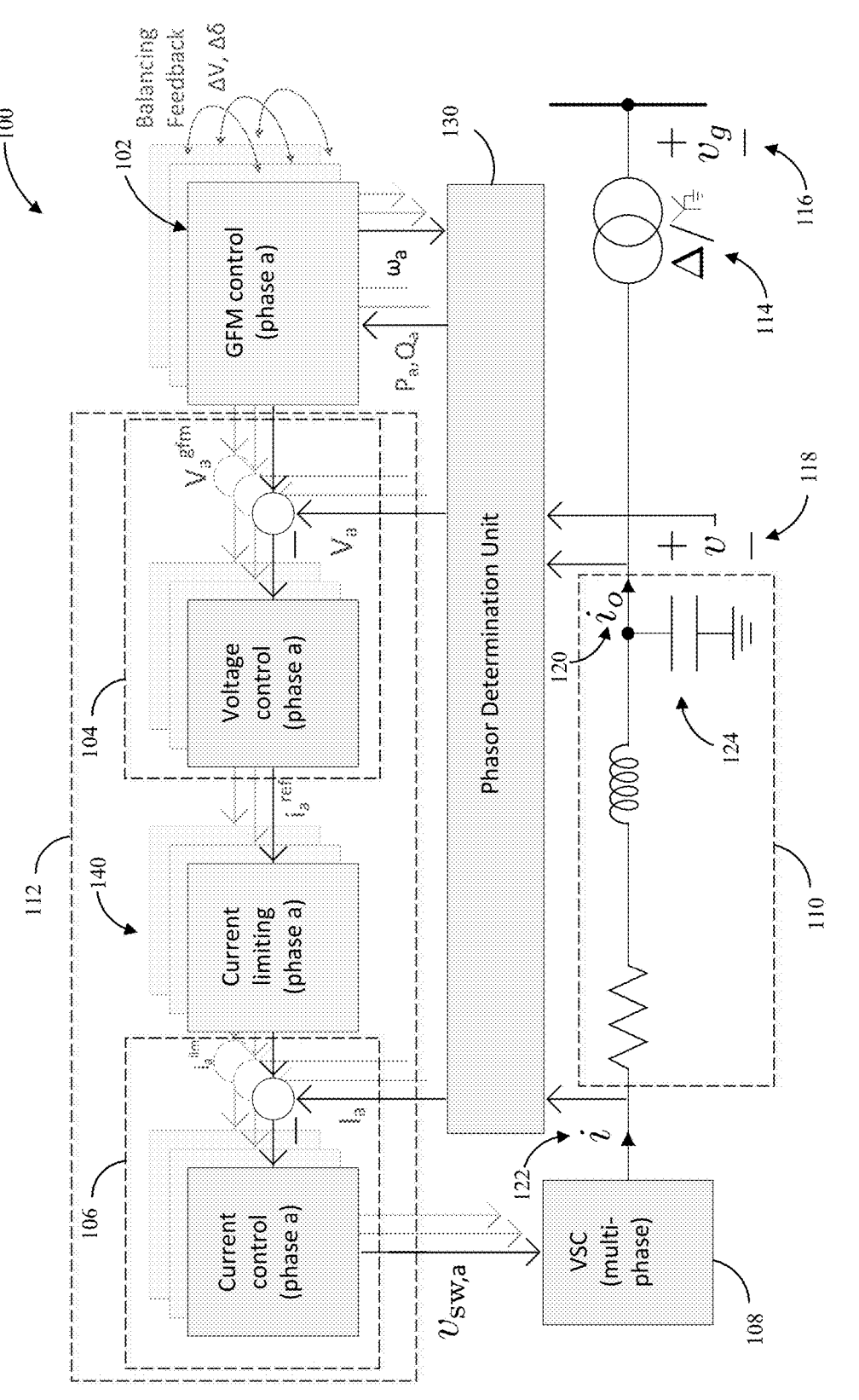
FIG. 1 illustrates an example grid forming converter, in accordance with an embodiment.

FIG. 1 illustrates a multi-phase, for example a three-phase, GFM converter 100 system according to various aspects of the present disclosure. In some embodiments, the GFM converter 100 may comprise, for each phase p∈ $\mathcal{P}$ (e.g., $\mathcal{P}$ defined as {a, b, c} for three phases a, b, and c), a GFM controller 102, a control loop 112, and a multi-phase VSC 108 having the same number of phases as the overall GFM converter 100 (e.g., three phases). In some embodiments, the control loop 112 for a phase may be configured to receive a voltage magnitude reference from the GFM controller 102 for that phase, and determine a modulated voltage reference for that phase to be provided to the VSC 108. In some embodiments, the control loop 112 may comprise a voltage controller 104 (e.g., configured as an outer control loop), and a current controller 106 (e.g., configured as an inner control loop). The gains of the inner and outer loops may be coordinated and chosen relative to the network circuit dynamics to ensure performance and stability. In some embodiments, the control loop 112 may comprise a current limiter between the voltage controller 104 and current controller 106. The GFM converter 100 may further comprise a phasor determination unit 130, a filter 110, and a power transformer 114. FIG. 1 representatively illustrates, as an exemplary embodiment, a GFM controller 102, voltage controller 104, current limiter 140, and current controller 106 for each of the multiple phases, and specifically labels these and their respective inputs and output for a first phase "a".

In some embodiments, the GFM converter 100 may comprise a current source inverter instead of a voltage source converter. The current source inverter may control the output AC waveform based on a current reference. In such embodiments, the current source inverter may receive the current reference from the voltage controller 104 (e.g., if current limiting is not implemented) or the output of the current limiter 140, without a need for the current controller 106.

The phasor determination unit 130 may comprise any suitable system or method configured to determine the quadrature components of the electrical signals of each of the phases at the output of the VSC 108 and/or filter 110. The phasor determination unit 130 may receive instantaneous multi-phase signals (e.g., electrical measurements) and determine respective phasors and a complex power for each phase. The phasor determination unit 130 may receive phase currents and voltages (e.g., measured by the phasor determination unit 130 or external to the phasor determination unit 130), and phase frequency references from the GFM controller 102, and may determine the quadrature components of the phase currents and voltages at the respective frequency references. Each measured value (phase current or voltage) and its determined quadrature component represent a current or voltage phasor at the given frequency.

In some embodiments, the phasor determination unit 130 may receive, for each phase, the measured filter current ($i_p$) output by the VSC 108 and the measured terminal voltage ($v_p$) (e.g., at the output of the VSC 108 or filter 110 (e.g., across a capacitor 124 of the filter 122)). In some embodiments, the phasor determination unit 130 may optionally also receive, for each phase, the measured output current ($i_{o,p}$) output by the filter 110. The phasor determination unit 130 may further receive, for reach phase, a frequency reference ($\omega_p$) from the GFM controller 102. In some embodiments, the phasor determination unit 130 may optionally also receive, for each phase, a voltage phase angle reference ($\theta_p$) from the GFM controller 102. The phasor determination unit 130 may implement a phasor estimation algorithm that uses the received electrical signals of every phase and the frequency reference to estimate the quadrature components of the electrical signals of every phase. In some embodiments, the phasor determination unit 130 may use the voltage phase angle reference ($\theta_p$) to align the coordinate frame with the respective rotating vector. The phasor determination unit 130 may provide the determined quadrature components along with the respective measured values (e.g., as voltage or current phasors (represented as upper case I and V herein)) to various components of the GFM converter 100, for example a current phasor to the current controller 106 and a voltage phasor to the voltage controller 104. In some embodiments, the phasor determination unit 130 may provide per-phase determined active power ($P_p$) and reactive power ($Q_p$) (or, for example, a complex power ($S_p$)).

Figure 2A:
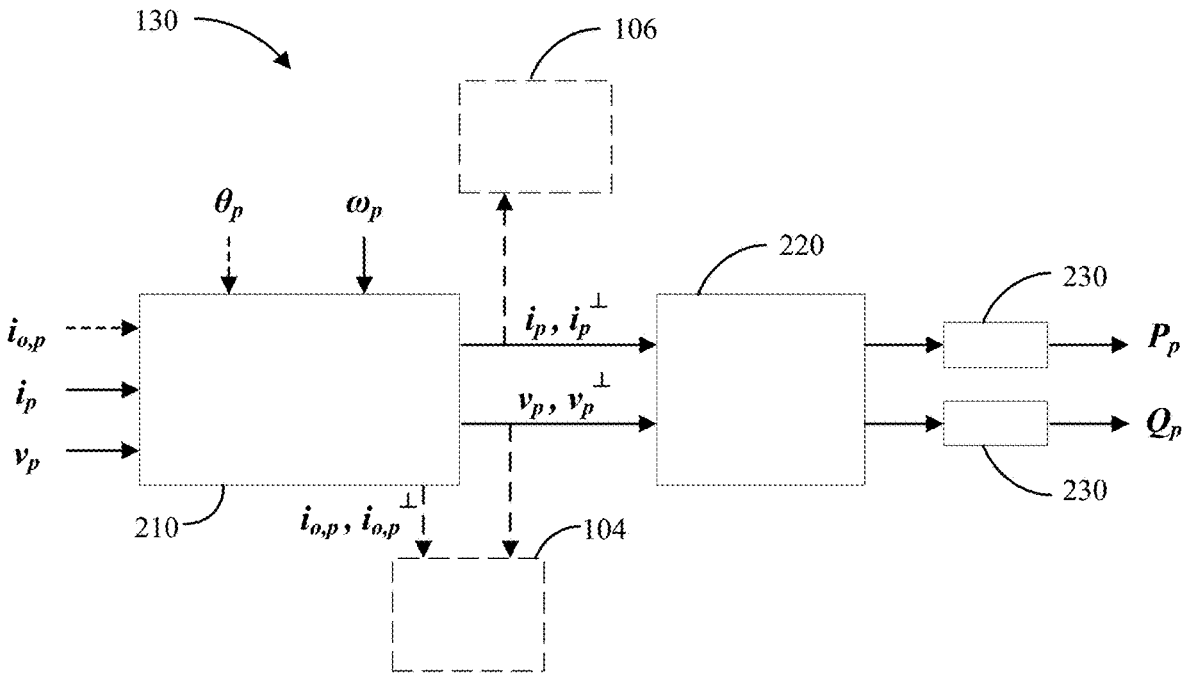
FIG. 2A schematically represents a phasor determination unit, in accordance with an embodiment.
Figure 2B:
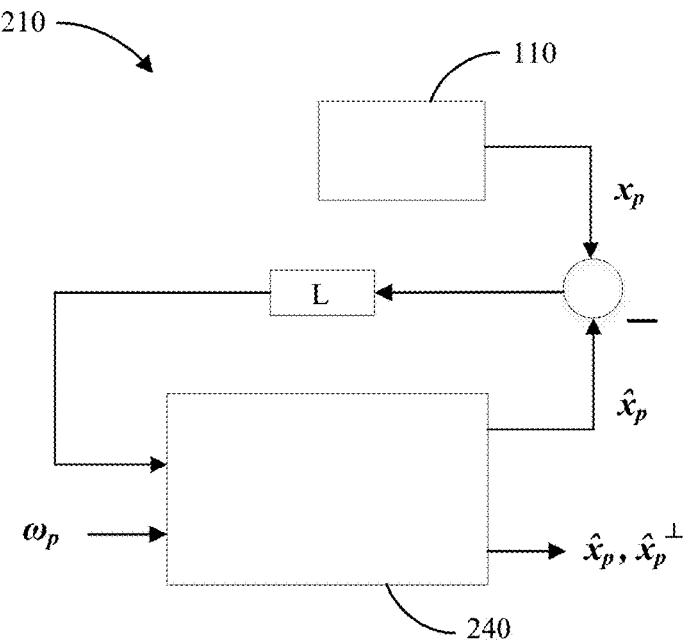
FIG. 2B schematically represents a state observer, in accordance with an embodiment.

Referring to FIG. 2A, the phasor determination unit 130 may comprise any suitable system or method for determining the quadrature (orthogonal) component of the received input signals (e.g., input $i_p$, $i_{o,p}$, $v_p$). As noted above, in some embodiments the phasor determination unit 130 may use the voltage phase angle reference ($\theta_p$) to align the coordinate frame, whereas in some alternative embodiments it need not be so aligned. In some embodiments, the phasor determination unit may comprise a phasor determination portion 210 and a power measurement portion 220. In some embodiments, the phasor determination portion 210 may implement a Hilbert transform, for example according to:

$$x_p^\perp(t) = x_p\left(t - \frac{1}{4(\omega_p(t))}\right) \tag{1}$$

where $x_p$ represents the respective per-phase voltage or current measurement (e.g., $i_p$, $i_{o,p}$, $v_p$), and $$x_p^\perp$$

represents its respective orthogonal component. Under the assumption that $x_p(t)$ is a sinusoid with slowly changing frequency $\omega_p(t)$, the time shifting in Eq. 1 approximates a 90 degree phase shift. In some alternative embodiments, briefly referring to FIG. 2B, the phasor determination portion 210 may be configured as a state observer, for example according to:

$$\frac{d}{dt}\begin{bmatrix} \hat{x}_p \\ \hat{x}_p^\perp \end{bmatrix} = \begin{bmatrix} 0 & -\omega_p \\ \omega_p & 0 \end{bmatrix}\begin{bmatrix} \hat{x}_p \\ \hat{x}_p^\perp \end{bmatrix} + L(x_p - \hat{x}_p) \tag{2}$$

wherein an estimator 240 performs the respective matrix calculation to determine $\hat{x}_p$ and $$\hat{x}_p^\perp,$$

L is the observer gain, and $\omega_p$ is again the per-phase frequency reference provided by the GFM controller 102. The observer gain L may be determined using standard methods, such as pole placement or LQR-type approaches. The method for determining the quadrature component according to Eq. 1 provides the component values without modification, whereas the state observer (e.g., according to Eq. 2) provides the components as filtered values. The power measurement portion 220 (as well as other respective components of the GFM converter 100) may be configured to accept the component values with or without modification (e.g., filtered or unfiltered components) depending on the phasor determination portion 210 implementation.

In some embodiments, an AC signal $x_p(t)$ (such as $i_p$, $v_p$, etc.) can be represented in a dq frame with reference angle $\theta_p(t)$ as:

$$x_{p,dq}(t) = R(\theta_p(t))\begin{bmatrix} x_p \\ x_p^\perp \end{bmatrix} \qquad (3)$$

where R is the 2D rotation matrix. The phasor can then be constructed as:

$$X_{p,dq}(t) = x_{p,d}(t) + j x_{p,q}(t). \qquad (4)$$

As noted above, upper-case variables may be used herein to refer to phasor quantities, but it will be understood that the use of phasor quantities may be interchangeable with the equivalent representations in the dq frame or the equivalent time-domain AC signal and its orthogonal component. Referring again to FIG. 2A, the power measurement portion 220 may receive the determined current and voltage phasors (e.g., $I_p$, $V_p$, or the respective components thereof (whether or not modified as discussed above)) from the phasor determination portion 210 and may determine the per-phase active power ($P_p$) and reactive power ($Q_p$). For example, in some embodiments the power measurement portion 220 may determine the respective average power values over one cycle according to:

$$P_p(t) = \frac{1}{2}\left(v_p(t)i_p(t) + v_p^\perp(t)i_p^\perp(t)\right), \qquad (5a)$$

$$Q_p(t) = \frac{1}{2}\left(v_p^\perp(t)i_p(t) - v_p(t)i_p^\perp(t)\right). \qquad (5b)$$

where $i_p(t)$ may generally be interchangeable with $i_{o,p}(t)$.

In some embodiments, the phasor determination unit 130 may include a filter portion 230, for example implementing a double line frequency notch filter to remove error in the estimation. The filter may have a center frequency of $2\omega_p$. For example, if implemented using a processing unit, the processing unit may run at a sampling rate. Therefore the time shift in the Hilbert transform cannot be implemented with infinite time resolution and may not be able to perform the time shift to the required accuracy. Moreover, performing the Hilbert transform may take a non-zero amount of time, so the required time shift may fall a little before or after a sampling period. Both of these aspects may lead to errors that the notch filter may alleviate.

Referring again to FIG. 1, the GFM controllers 102 may receive the phasors or estimates of the phase powers (e.g., active and reactive power, represented as S in FIG. 1)

obtained from the phasors for every electrical signal for each phase, and each GFM controller 102 may provide a voltage magnitude reference $$\left(V_p^{gfm}\right)$$

to the respective voltage controller 104 and a frequency reference ($\omega_p$) to the phasor determination unit 130. In some embodiments, the GFM controllers 102 may comprise any suitable system or method for determining a voltage magnitude reference and frequency reference for a phase based at least partially on phase quantities of the current and voltage output by the VSC 108 (for example received from the phasor determination unit 130) as well as a balancing feedback. In some embodiments, the multiple GFM controllers 102 (one for each phase) may be implemented by a single GFM controller configured to determine the respective per-phase values. In some embodiments, the GFM controller 102 may implement so-called droop control.

Figure 3A:
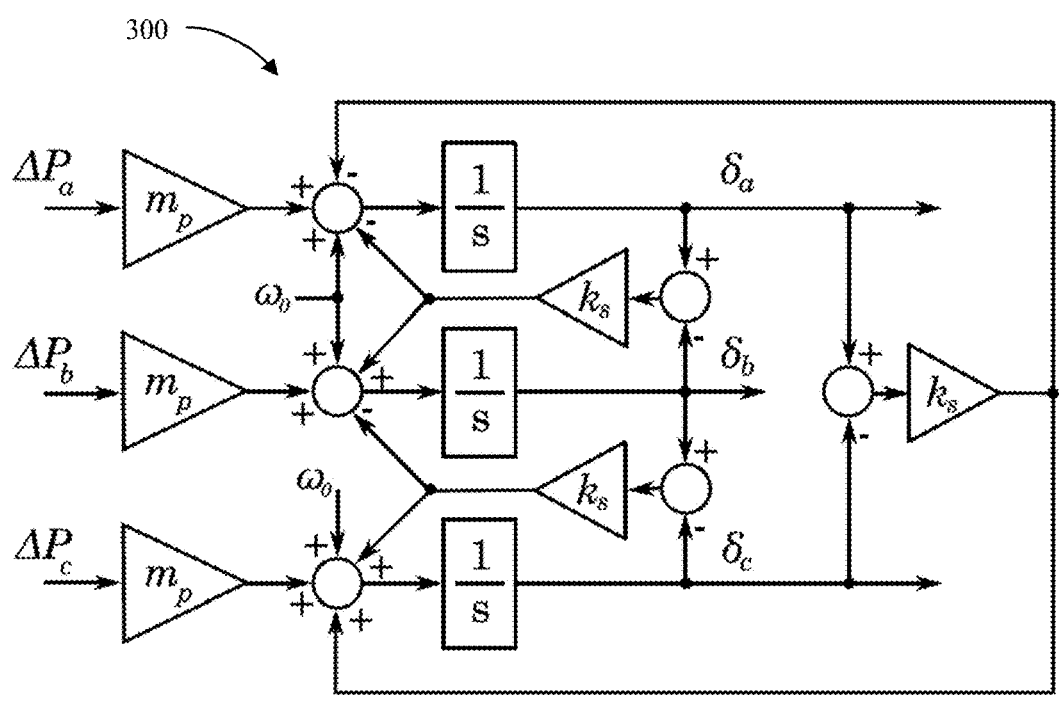
FIG. 3A schematically represents an active power droop controller, in accordance with an embodiment.
Figure 3B:
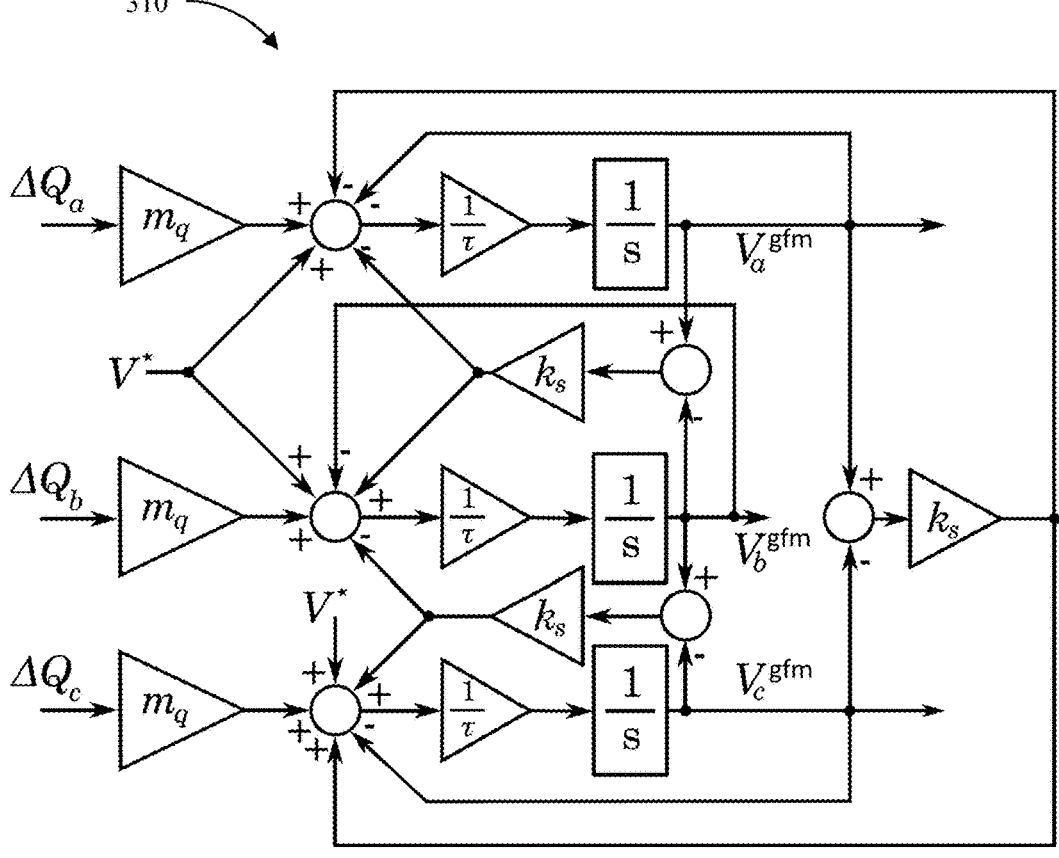
FIG. 3B schematically represents a reactive power droop controller, in accordance with an embodiment.

As noted above, the GFM controller 102 may implement a balancing feedback to configurably balance voltage magnitude and angles across the phases (e.g., a voltage magnitude balancing feedback and an angle balancing feedback, respectively) based on desired tradeoffs. In some embodiments, the balancing feedback may be implemented with an active power droop control and reactive power droop control, for example according to (in per unit):

$$\frac{d}{dt}\delta_p = \omega_o - \sum_{l \in \mathcal{P}\backslash p} k_s(\delta_p - \delta_l) + m_P\left(P_p^* - P_p\right), \qquad (6)$$

$$\tau\frac{d}{dt}V_p^{gfm} = -V_p^{gfm} + V^* - \sum_{l \in \mathcal{P}\backslash p} k_s\left(V_p^{gfm} - V_l^{gfm}\right) + m_Q\left(Q_p^* - Q_p\right), \qquad (7)$$

where $V^{gfm}$ are the voltage magnitude references for the phases, $\delta$ are the deviations of the voltage phase angle reference from a balanced synchronous solution for each phase, $m_p$ and $m_Q$ are the droop gains, $k_s$ is the phase balancing gain and controls the tradeoff between voltage and power unbalance (e.g., larger $k_s$ results in more balanced voltage), $\mathcal{P}$ represents the set of phases (as discussed above), the subscript lower-case "p" refers to the phase being evaluated (e.g., phase a, b, or c), $\tau$ is a lowpass filter time constant, $\omega_o$ is the nominal frequency, $V^*$ is the voltage setpoint, and $$P_p^* \text{ and } Q_p^*$$

are the active and reactive power setpoints (respectively). Eq. 6 representatively illustrates an exemplary angle balancing feedback, and Eq. 7 representatively illustrates an exemplary voltage magnitude balancing feedback. FIG. 3A illustrates an exemplary embodiment of an active power droop controller 300 implementing Eq. 6 using hardware and/or software components. The quantity $$\left(P_p^* - P_p\right)$$

from Eq. 6 is represented in FIG. 3A by $\Delta P_p$ for each of the respective phases. FIG. 3B illustrates an exemplary embodiment of a reactive power droop controller 310 implementing Eq. 7 using hardware and/or software components.

The balancing feedback may synchronize all individual GFM controllers 102, for example ensuring that their voltage magnitudes are identical and phase angles are shifted by the appropriate amount when possible (e.g. phase angles shifted by 120 degrees for a three-phase GFM converter 100), and otherwise trading off voltage and power unbalance. In some embodiments, the variables $m_P$ and $m_Q$ may be provided by a system operator, t may be small and generally fixed, and $k_s$ may be application-dependent (e.g., distribution, transmission, etc.) but tunable as described above. For example, in a distribution system setting one may simulate predetermined test cases, taking into consideration load unbalance and equipment requirements (e.g., induction motor requirements), and increase $k_s$ until the voltage unbalance remains under a given threshold. In a transmission system setting, simulations of unbalanced faults may be used to decrease $k_s$ to improve, e.g., the critical clearing time by allowing increased voltage unbalance during unbalanced faults.

The frequency reference ($\omega_p$) may be determined according to:

$$\omega_p = \omega_0 + \frac{d}{dt}\delta_p, \tag{8}$$

where the quantities $$\frac{d}{dt}\delta_p$$

may be taken, for example, from just prior to the integration blocks ("1/s") in FIG. 3A. The voltage phase angle reference ($\theta_p$) may be determined according to:

$$\theta_p = \delta_p + \theta_p^{bal}, \tag{9}$$

where $$\left(\theta_a^{bal}, \theta_b^{bal}, \theta_c^{bal}\right) = \left(0, \frac{2}{3}\pi, -\frac{2}{3}\pi\right)$$

for a three-phase system.

Accordingly, the GFM controllers 102 may determine voltage magnitude references (e.g., $$V_a^{gfm}, V_b^{gfm}, V_c^{gfm})$$

and frequency references (e.g., $\omega_a$, $\omega_b$, $\omega_c$) according to Eqs. 6-8 above. The GFM controller 102 may output the voltage magnitude references to the control loop 112 (e.g., to voltage controllers 104), and the frequency references to the phasor determination unit 130. In some embodiments, for example when the control loop 112 is configured to operate on an aligned reference frame, the GFM controllers 102 may determine the voltage phase angle references $\theta_p$ according to Eq. 9 above and may provide them to the phasor determination unit 130. In some embodiments, the control loop 112 may be configured to operate without an aligned reference frame and the voltage phase angle reference need not be determined.

In some embodiments, the control loop 112 may comprise a voltage controller 104 for each phase. The voltage controller 104 may comprise any suitable system or method for determining the difference (e.g., error) between a voltage magnitude reference for a phase and a measured voltage for the phase, and accordingly determining a current reference. Therefore, the control loop 112 may determine multiple current references (e.g., $$i_a^{ref}, i_b^{ref}, i_c^{ref}),$$

one from each voltage controller 104. Current reference determination may be performed by any suitable system or method. In some embodiments, the voltage controller 104 may comprise a proportional integral (PI) controller, for example in a dq frame relative to the GFM voltage phase angle reference $\theta_p$, configured to determine the current reference based on the determined error. In some embodiments, the voltage controller 104 may comprise a proportional resonant (PR) controller, proportional integral derivative (PID) controller, or the like.

In some embodiments, the voltage controller 104 may comprise a PI controller and the current reference may be determined according to:

$$i_{p,dq}^{ref} = i_{o,p,dq} + Y_f v_{p,dq} + G_{PI}(s)\left(v_{p,dq}^{gfm} - v_{p,dq}\right) \tag{10}$$

where $$i_{p,dq}^{ref}$$

are the current references, $G_{PI}(s)$ is the PI controller function, $Y_f$ is the filter admittance matrix (i.e., based on the filter 110), and voltage reference $$v_{p,dq}^{gfm} = \left(V_p^{gfm}, 0\right).$$

In some embodiments, the control loop 112 may comprise a current limiter 140 for each phase. Current limiting may be implemented with any suitable system or method. In some embodiments, the current limiter 140 may be configured to receive the current references $$\left(i_p^{ref}\right)$$

and determine current-limited references $$\left(i_p^{lim}\right)$$

for input to the current controller 106, for example by scaling the current reference vector down if its magnitude is too large. According to some embodiments, if current limiting is applied to phase a (e.g., during a phase a to ground fault), then current limiting may dominate (e.g., over the balancing feedback) for phase a, while the balancing feedback continues to control phases b and c. For further example, current limiting may be performed using instantaneous saturation limits, vector amplitude limitation/latched limits, virtual impedance, virtual admittance, or the like. In some embodiments according to the present disclosure, the current-limited references may be based on the maximum phase current magnitude $I_{max}$, for example according to:

$$i_p^{lim} = \begin{cases} i_p^{ref}, & \left\| i_p^{ref} \right\| \le I_{max} \\ i_{max} \angle i_p^{ref}, & \left\| i_p^{ref} \right\| > I_{max} \end{cases}. \quad (11)$$

Notably, a current limiter 140 according to Eq. 11 will not clip the current waveform, and instead adjusts the magnitude of the sinusoidal reference current for every phase to avoid introducing harmonics into the system.

In some embodiments, for example when the power converter is a VSC, the control loop 112 may comprise a current controller 106 for each phase. The current controller 106 may comprise any suitable system or method for determining the difference (e.g., error) between a current reference for a phase and a measured current for the phase, and accordingly determining a modulated voltage reference for the VSC 108. Therefore, the control loop 112 may determine multiple modulated voltage references (e.g., $v_{sw,a}$, $v_{sw,b}$, $v_{sw,c}$), one from each current controller 106. Modulated voltage reference determination may be performed by any suitable system or method. In some embodiments, the current controller 106 may comprise a proportional integral (PI) controller in a dq frame relative to the GFM voltage phase angle reference $\theta_p$ configured to determine the modulated voltage reference based on the determined error. In some embodiments, the current controller 106 may comprise a proportional resonant (PR) controller, proportional integral derivative (PID) controller, or the like.

In some embodiments, the current controller 106 may comprise a PI controller and the modulated voltage reference may be determined according to:

$$v_{sw,p,dq} = v_{p,dq} + Z_f i_{p,dq} + G_{PI}(s)\left(i_{p,dq}^{lim} - i_{p,dq}\right), \quad (12)$$

where $v_{sw,p}$ are the modulated voltage references and $Z_f$ is the filter impedance matrix (i.e., based on the filter 110). In some embodiments, the modulated voltage references may be determined based on the current references $$\left(i_p^{ref}\right)$$

instead of the current-limited references $$\left(i_p^{lim}\right),$$

for example when no current limiting is implemented.

In some embodiments, the VSC 108 may comprise any suitable system or method for converting an input power to an output AC voltage waveform for each phase of the GFM converter 100. The VSC 108 may be configured to receive power from any suitable power source (not shown), such as renewable generation (e.g., solar PV), energy storage (e.g., batteries), and the like. The VSC 108 may be configured to determine the AC voltage waveform for each phase based upon the received modulated voltage references from the current controllers 106 (e.g., $v_{sw,a}$, $v_{sw,b}$, $v_{sw,c}$). The VSC 108 may convert the received modulated voltage references into appropriate control signals. For example, in the case of a two-level DC/AC voltage source converter, the VSC 108 may convert the modulated voltage references to appropriate pulse width modulated signals. For further example, in the case of a modular multi-level converter, the VSC 108 may convert the modulated voltage references using nearest level or optimized switching frequency modulation. In addition, as mentioned above, if the GFM converter 100 uses a current source inverter instead of a voltage source converter, the current source inverter may be controlled from the current-limited reference $$i_p^{lim}.$$

When the midpoint of the DC side of the VSC 108 is grounded, the phase-to-ground voltages can be controlled on the AC side as described above. If the midpoint of the DC side is not grounded, phase-to-phase voltages of two "virtual" phases (instead of three physical phases) may be controlled by implementing the control described above in αβ coordinates using a Clarke transform (e.g., synchronize to a phase difference of 90 degrees instead of 120 degrees, and the set $\mathcal{P}$ would contain two entries instead of three).

In some embodiments, the VSC 108 may output the AC voltage waveform to the filter 110. The filter 110 may provide the filtered phase waveforms to the power transformer 114. The filter 110 may be configured to remove switching harmonics. In some embodiments, the filter may be used in delta or wye configuration based on the grounding of the DC side and tradeoffs between voltage magnitude and fault ride through on the AC side. The power transformer 114 may comprise any suitable transformer configurable to connect to an external power grid 116. In some embodiments, the power transformer 114 may comprise a wye or delta configuration. In some transmission systems, a wye-connected filter, delt-wye-ground transformer with grounding on the grid side may be used to achieve a path for fault current. In some microgrids and distribution systems, delta-connected filters may be used with no transformer (or an inductor in place of the transformer to increase coupling impedance to the network) to increase the voltage magnitude on the AC side.

Figure 4:
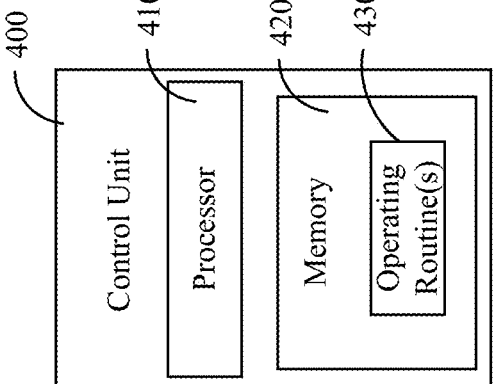
FIG. 4 illustrates an example controller, in accordance with an embodiment.

Referring to FIG. 4, various components of the GFM converter 100 may be implemented on one or more controllers 400. In some embodiments, all phases of the GFM converter 100 are implemented using the same controller 400. In some embodiments, the control for each phase of the GFM converter 100 may be implemented using separate controllers 400. The controller 400 may be configured to send and/or receive information (e.g., including instructions, data, values, signals, or the like) to/from the various components of the GFM converter 100. The controller 400 may comprise processing circuitry 410, for example, a processor, DSP, CPU, APU, GPU, microcontroller, application-specific integrated circuit, programmable gate array, and the like, any other digital and/or analog components, as well as combinations of the foregoing (whether distributed, networked, locally connected, or the like), and may further comprise inputs and outputs for receiving and providing control instructions, control signals, drive signals, power signals, sensor signals (e.g., current or voltage sensor output), digital signals, analog signals, and the like. All such computing devices and environments are intended to fall within the meaning of the term "controller," "control unit," "processor," "processing device," or "processing circuitry" as used herein unless a different meaning is explicitly provided or otherwise clear from the context. In some examples, the controller 400 may comprise one or more such processor devices.

The controller 400 may comprise processing circuitry 410 configured to execute operating routine(s) 430 stored in a memory 420. The memory 420 may include any suitable volatile memory, non-volatile memory, storage, any other suitable type of storage medium, or any suitable combination thereof. For example, the memory 420 may include RAM, ROM, EEPROM, one or more flash drives, one or more hard disks, one or more solid state drives, one or more optical drives, etc. In some embodiments, the memory 420 may have encoded thereon a computer program (e.g., operating routine) for controlling operation of the controller 400, GFM controller 102, voltage controller 104, current controller 106, the current limiter 140, the VSC 108, the phasor determination unit 130, and the like. In some embodiments, the various components of the GFM converter 100 may be implemented entirely as software (e.g., operating routine), entirely as hardware, or any suitable combination thereof. In some embodiments, the operating routine(s) 430 may comprise firmware.

In some implementations, devices or systems disclosed herein can be utilized or configured for operation using methods embodying aspects of the invention. Correspondingly, description herein of particular features, capabilities, or intended purposes of a device or system is generally intended to inherently include disclosure of a method of using such features for the intended purposes, a method implementing such capabilities, and a method of configuring disclosed (or otherwise known) components to support these purposes or capabilities. Similarly, unless otherwise indicated or limited, discussion herein of any method of manufacturing or using a particular device or system, including configuring the device or system for operation, is intended to inherently include disclosure, as embodiments of the invention, of the utilized features and implemented capabilities of such device or system.

Correspondingly, some embodiments of the present disclosure can include a method for providing multi-phase (e.g., three-phase) grid forming control using multiple single-phase grid forming controls and/or single-phase power converters with balancing feedback. In some embodiments, single-phase GFM controls (e.g., control loop 112 and GFM controller 102) may be implemented on a separate controller (e.g., controller 400) for each phase, with either a single multi-phase power converter or separate single-phase power converters for each phase. The separate controllers may implement a high sampling rate (e.g., in real-time) for measuring and processing the electric signals, while the balancing feedback may be implemented through communication at a lower rate. For example, a set of buildings (e.g., homes) may collectively receive multiple phases (e.g., three phases) of power with each building receiving one of the phases of power from a single-phase power converter, and each single-phase power converter may be controlled by single-phase GFM controls with balancing feedback performed through a lower-bandwidth communication. For further example, some of the more complex converter topologies (e.g., a modular multilevel converter) may be implemented as a multi-phase power converter consisting of separate power electronic modules for every phase, and communicating electrical measurements and control signals to a centralized controller may result in a high cost. In such cases, the GFM controls may be separated into single-phase GFM control for every separate power electronic module each implementing one phase control using local measurements and implementing balancing feedback through communication, which would require less communication between the individual controllers.

Figure 5:
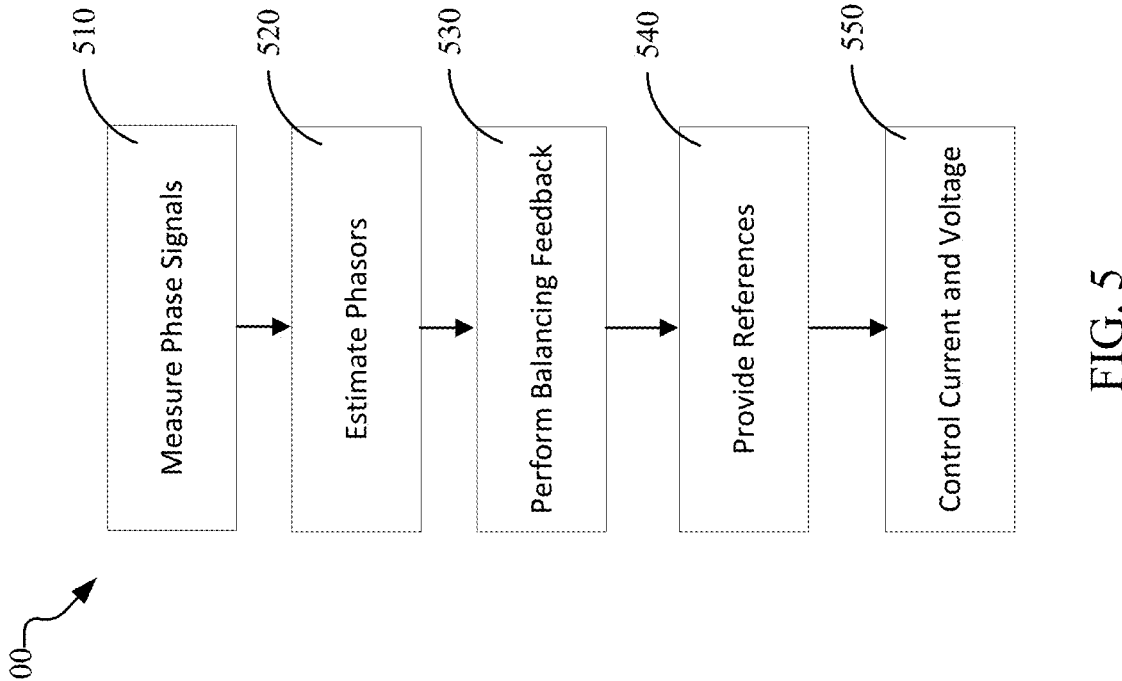
FIG. 5 illustrates a method for grid forming control, in accordance with an embodiment.

Referring to FIG. 5, a non-limiting example of method for grid forming control 500 is illustrated. In some embodiments, the grid forming control method 500 may be implemented in the controller 400, for example, as operating routines 430 stored in memory 420 (e.g., as software). The grid forming control method 500 may comprise measuring electrical signals of each phase 510, estimating phase quantities of the measured electrical signals 520, performing balancing feedback based on the estimated phase quantities 530, providing a voltage magnitude reference and frequency reference for each phase 540, and controlling the current and filter voltage for each phase 550.

At step 510, electrical signals of each phase may be measured. In some embodiments, the filter current ($i_p$) 122 output by the VSC 108, the output current ($i_o$) 120 of the filter 110, and the terminal voltage ($v_p$) 118 (e.g., at the output of the VSC 108 or across the capacitor 124 of the filter 110) may be measured. At step 520, the direct and quadrature components of the current and voltage of each phase may be determined, for example by the phasor determination unit 130. In some embodiments, the frequency reference $\omega_p$ from step 530 (e.g., implemented by the GFM controller 102) may be used in the phasor estimation. In some embodiments, the quadrature components may be estimated using a Hilbert transform (Eq. 1) or a state observer (Eq. 2). Further, at step 520, active and reactive power phasors may be determined based on the determined direct and quadrature components of the electrical signals from step 510, for example according to Eqs. 5a and 5b. In some embodiments, phasor estimation may further include filtering through a double line frequency notch filter to remove error in the estimation.

At step 530, balancing feedback may be performed among the multiple phases, for example by a GFM controller 102 for each phase. In some embodiments, balancing feedback 530 may comprise synchronizing the multiple (e.g., three) grid forming controllers 102. For example, balancing feedback 530 may include ensuring that the voltage magnitude of each phase are identical and phase angles are shifted by the appropriate amount (e.g., 120 degrees for a three-phase GFM converter 100) when possible and otherwise trading off voltage and power unbalance. In some embodiments, balancing feedback may be performed based on the phasors determined in step 520. In some embodiments, performing balancing feedback 530 may include using Eqs. 6 and 7 (as described above) to configurably balance voltage magnitude and phase angles according to desired tradeoffs. Accordingly, voltage magnitude references (e.g., $$V_p^{gf_m})$$

and frequency references (e.g., $\omega_p$) may be determined at step 530.

At step 540, the determined voltage magnitude references and frequency references may be provided to the various components of the GFM converter 100. In some embodiments, at step 540, the voltage magnitude references may be provided to control the power converter (e.g., the VSC 108). For example, the voltage magnitude references may be provided, per-phase, to a respective control loop 112 for that phase, which may determine control signals for the power converter. In some embodiments, at step 540, the frequency references may be provided to the phasor determination unit 130, for example to use in step 520 as described above. The various references may be provided in any suitable manner, for example as digital representations, analog signals, or the like.

At step 550, the current and voltage output by the GFM converter 100 may be controlled. In some embodiments, at step 550, the current and voltage output by the GFM converter 100 may be controlled by the respective control loop 112 per phase, for example by providing a control signal to the VSC 108 or a current source inverter. In some embodiments, at step 550, the received voltage magnitude reference for each phase may be compared to the measured voltage for the phase, and a current reference for each phase determined accordingly, for example according to Eq. 10. In some embodiments, the current references are determined by a voltage controller 104 for each phase.

In some embodiments, at step 550, current limiting may be performed on the determined current references, for example by the current limiter 140. For example, in the case of an unbalanced fault, current limiting may be performed per-phase, for example according to Eq. 11, to limit the current output by the GFM converter 100. The current reference vector may be re-scaled if its magnitude is too large. In some embodiments, if a first phase is current limited (overriding the balancing feedback for that phase), the remaining phases may still be controlled according to the balancing feedback. In some embodiments, for example when the power converter is a current source inverter, the current-limited reference may be provided to the control the current source inverter and thus the current and voltage output by the GFM converter 100.

In some embodiments, at step 550, for example when the power converter is a voltage source converter, the determined current reference or current-limited reference for each phase may be compared to the measured current for the phase, and a modulated voltage reference for each phase determined accordingly, for example according to Eq. 12. In some embodiments, current limiting may be performed prior to comparing with the measured current. In some embodiments, the modulated voltage references are determined by a current controller 106 for each phase. The modulated voltage reference may be provided, at step 550, to the VSC 108 to control its output, and thus the current and voltage output by the GFM converter 100.

As described above, the voltage and current output by the GFM converter 100 may be output according to the control signal from the control loop 112, for example by the VSC 108 and through a filter 110. The grid forming control method 500 may then repeat, for example starting with measuring the new electrical signals of each phase 510. The operating frequency of the grid forming control method may depend on the switch technology and converter topology. In some exemplary embodiments, the grid forming control method 500 may operate at about 500 Hz, 1000 Hz, 5,000 Hz, 10,000 Hz, 20,000 Hz, or the like.

Figure 6:
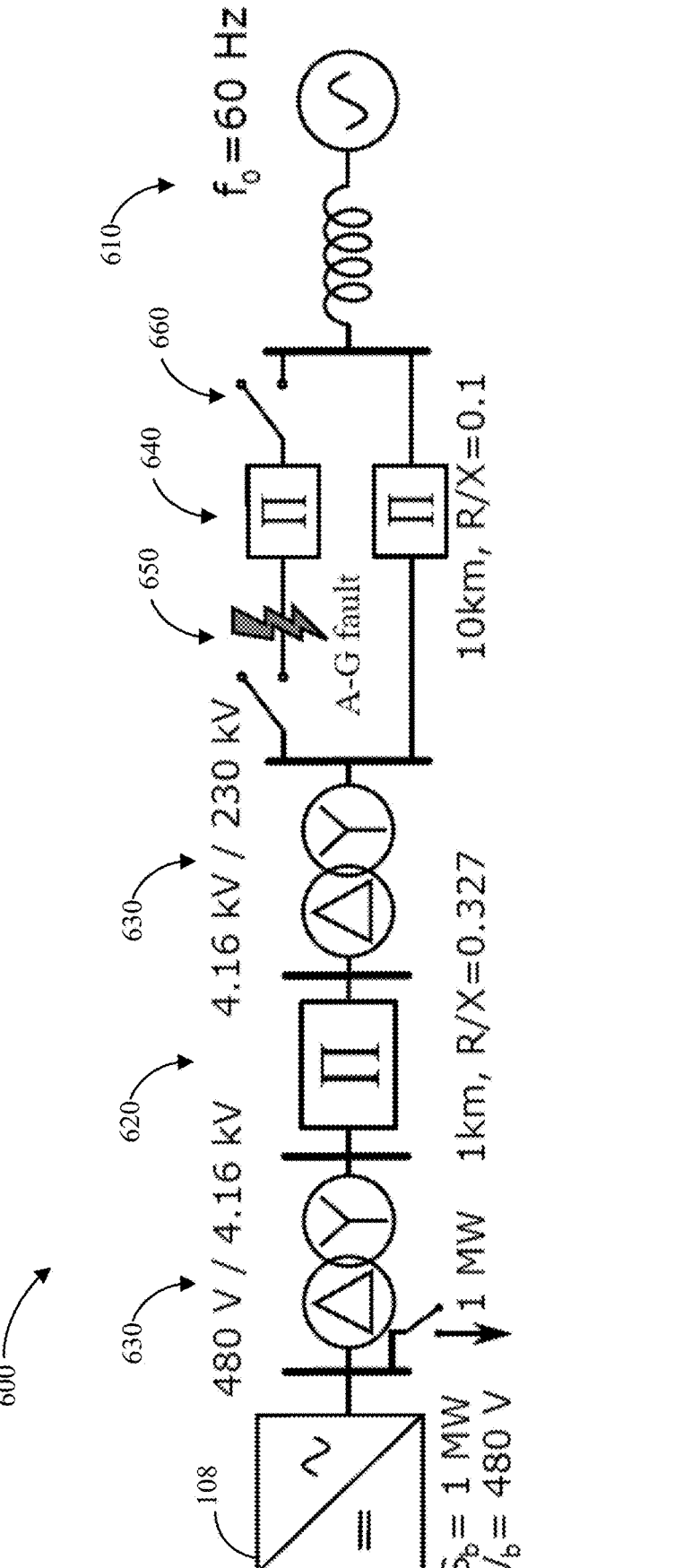
FIG. 6 illustrates a model comprising a grid forming converter, in accordance with an embodiment.

Referring to FIG. 6, by way of example, a model 600 of a three-phase distribution network having a GFM converter 100 according to the present disclosure was created and simulated. The GFM control (e.g., 102, 112, 130 (not shown)) controls a two-level DC/AC VSC 108 modeled as connected to an infinite bus 610 through a 1 kilometer medium voltage line 620, a 10 kilometer double circuit high voltage transmission line 640, and step up transformers 630. The respective modeled system parameters are shown in FIG. 6, and the GFM control ($m_P=m_Q=5\%$) is implemented at a sampling rate of 10 kHz. The VSC 108 receives an input power (not shown), for example from a renewable energy source, and outputs controlled voltages and currents for phases A, B, and C.

To illustrate the impact of separate voltage and current control and current limiting for every phase on unbalanced fault ride through, the zero impedance line-to-ground (A-G) fault 650 of the model 600 can be activated, which can be cleared by opening the circuit breaker(s) 660 which may happen after ten AC cycles (e.g. at 60 Hz). The GFM converter 100 can limit current during the fault. If the fault is cleared within the critical clearing time, the system can continue operating as normal.

Figure 7C:
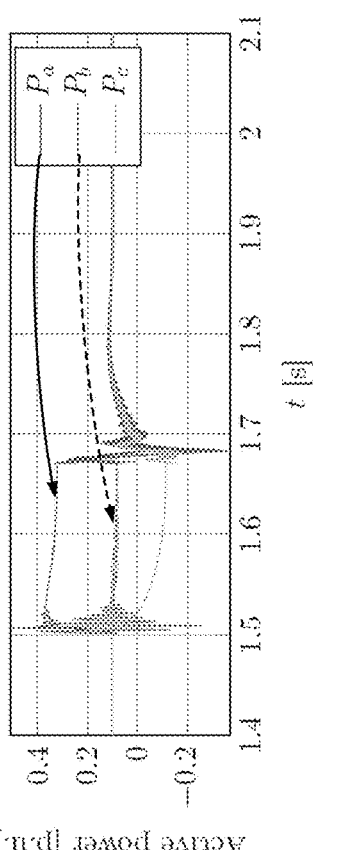
FIG. 7C graphically represents the active power in response to a fault condition in the model of FIG. 6, in accordance with an embodiment.
Figure 7A:
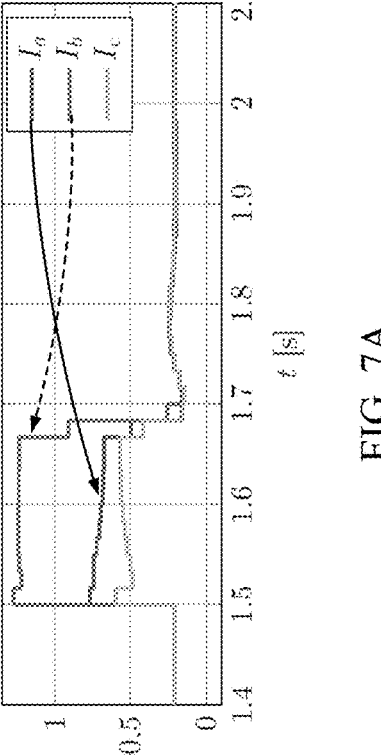
FIG. 7A graphically represents the magnitude of the filter current phasors in response to a fault condition in the model of FIG. 6, in accordance with an embodiment.
Figure 7D:
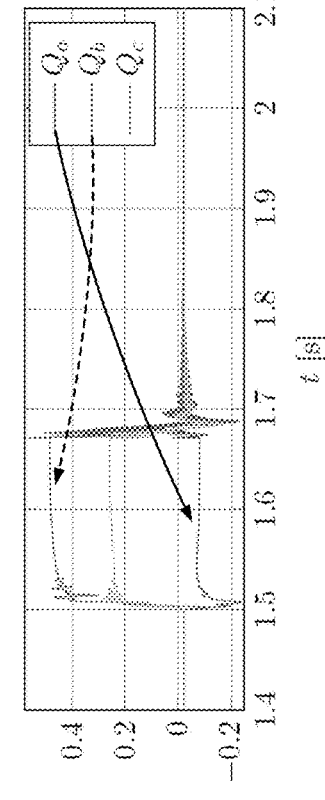
FIG. 7D graphically represents the reactive power in response to a fault condition in the model of FIG. 6, in accordance with an embodiment.
Figure 7B:
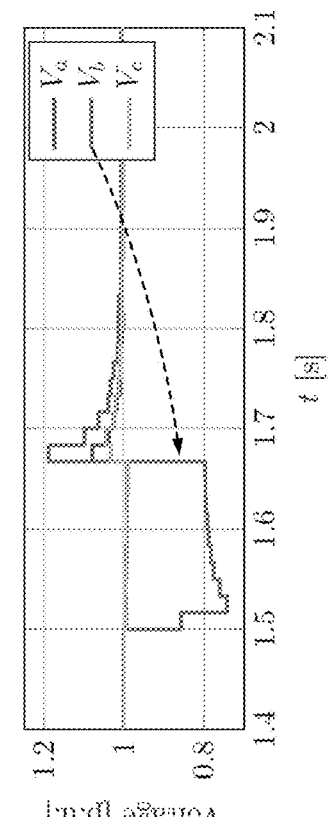
FIG. 7B graphically represents the magnitude of the terminal voltage phasor in response to a fault condition in the model of FIG. 6, in accordance with an embodiment.

FIGS. 7A-7D illustrate the response of the GFM converter 100 and the model 600 to the fault on one line (e.g., the A-G fault 650) that occurs as 1.5 seconds. Note that due to the transformer connection, the fault applied to phase A of the transmission line is effectively mapped to phase B at the VSC 108 terminal. In this example, $k_s=10^5$. FIGS. 7A and 7B illustrate the magnitude of the terminal voltage $V_p$ and filter current $I_p$ phasors for each phase, respectively (in per unit). Because the magnitudes of the phase voltages and currents are not well-defined within a cycle, the maximum magnitude over one cycle is shown. FIGS. 7C and 7D illustrate the active power $P_p$ and reactive power $Q_p$ for each phase, respectively (in per unit). The results show that the current limiter 140 and current controller 106 successfully limit the current magnitude to $I_{max}=1.2$ p.u. within each cycle. By controlling the current phasor for every phase, the GFM control according to the present disclosure manages sub-cycle overcurrent. At approximately 1.675 seconds, the faulted line is cut off (i.e., by circuit breakers 660). Once the fault is cleared, a resynchronization transient is observed.

One or more GFM converters 100 according to the present disclosure may be used for any given power generation application. For example, on a wind farm, each wind turbine may use one or two GFM converters 100. An exemplary solar farm may use many GFM converters 100, with each GFM output coupled to the same transformer (e.g., a transformer as represented by transformers 630 in the model 600) and each GFM input coupled to solar panels or batteries. In some embodiments, a plurality of parallel transformer may be used, each with several GFMs 100 per transformer.

In some applications, only individual phases of a three-phase power supply are used, for example to individual homes or individual floors of a high-rise building. For example, a first floor of a building might receive a first phase, a second floor of a building might receive a second phase, and a third floor of a building might receive a third phase. A GFM converter 100 according to the present disclosure may perform balancing feedback (e.g., by GFM controllers 102) between the first, second, and third floor.

Similarly, each of a plurality of houses may receive a single phase from among the three phases. A GFM converter 100 may perform balancing feedback between single-phase GFM converters 100 at the houses.

Systems and methods according to the present disclosure have several advantages. The balancing gain $k_s$ allows for adjustment of trade-off between phase voltage unbalance and power unbalance at the converter ac terminal, for example allowing to adjust the contribution of a DC/AC VSC to mitigating voltage unbalances in a distribution system. Further, the control described herein tracks voltage references for every phase, and can control and limit the phase currents individually. In addition, the control described herein can addresses sub-cycle overcurrent by continuously estimating and controlling phase current phasors and limiting their magnitude.

It will be appreciated by those skilled in the art that while the disclosed subject matter has been described above in connection with particular embodiments and examples, the present disclosure and the claims of the present disclosure are not necessarily so limited, and that numerous other embodiments, process flows and step ordering, examples, uses, modifications and departures from the embodiments, examples and uses are intended to be encompassed by the claims attached hereto. It will be appreciated that there are additional ways to implement the control methods described herein with different topologies and hardware/software, while using the same signal/phase estimations techniques. The entire disclosure of each patent and publication cited herein is hereby incorporated by reference, as if each such patent or publication were individually incorporated by reference herein.

Various features and advantages of the various aspects presented in the present disclosure are set forth in the following claims.

We claim:

1. A grid forming control system for a power converter having a plurality of phases, comprising:
   a phasor determination unit configured to, for each of the plurality of phases:
      receive a frequency reference for the phase; and
      determine an active power and a reactive power for the phase based on an electrical measurement for the phase and the frequency reference for the phase;
   a GFM controller configured to, for each of the plurality of phases:
      determine the frequency reference for the phase based on the active power for the phase and an angle balancing feedback across the plurality of phases; and
      determine a voltage magnitude reference for the phase based on the reactive power for the phase and a voltage magnitude balancing feedback across the plurality of phases; and
   a control loop configured to, for each of the plurality of phases, determine a control signal for the power converter based on the determined voltage magnitude reference for the phase.

2. The control system of claim 1, wherein the grid forming control system comprises three phases.

3. The control system of claim 1, wherein:
   determining the voltage magnitude reference for the phase based on the voltage magnitude balancing feedback comprises determining the voltage magnitude reference for the phase based on the voltage magnitude reference for each of the plurality of phases; and determining the frequency reference for the phase based on the angle balancing feedback comprises determining the frequency reference for the phase based on the frequency reference for each of the plurality of phases.

4. The control system of claim 3, wherein the GFM controller determines the frequency reference for each phase according to:

$$\frac{d}{dt}\delta_p = \omega_o - \sum_{l \in \mathcal{P}\backslash p} k_s(\delta_p - \delta_l) + m_P(P_p^* - P_p)$$

where $\delta_p$ is the deviation of the voltage phase angle reference $\theta_p$ for the respective phase, $m_P$ is the active power droop gain, $k_s$ is the phase balancing gain, $\mathcal{P}$ is the set of the plurality of phases, the subscript lower-case "p" is the phase being evaluated, $\omega_o$ is the nominal frequency, $$P_p^*$$

is the active power setpoint for the respective phase, and $P_p$ is the determined active power for the respective phase.

5. The control system of claim 3, wherein the GFM controller determines the voltage magnitude reference for each phase according to:

$$\tau\frac{d}{dt}V_p^{gfm} = -V_p^{gfm} + V^* - \sum_{l \in \mathcal{P}\backslash p} k_s\left(V_p^{gfm} - V_l^{gfm}\right) + m_Q(Q_p^* - Q_p)$$

where $$V_p^{gfm}$$

is the voltage magnitude reference for the respective phase, $m_Q$ is the reactive power droop gain, $k_s$ is the phase balancing gain, $\mathcal{P}$ is the set of the plurality of phases, the subscript lower-case "p" is the phase being evaluated, V* is the voltage setpoint, $$Q_p^*$$

is the reactive power setpoint for the respective phase, and $Q_p$ is the determined reactive power for the respective phase.

6. The control system of claim 1, wherein the control loop comprises, for each of the plurality of phases, a voltage controller and current limiter, wherein:
   each voltage controller is configured to determine a current reference for the phase based on the determined voltage magnitude reference for the phase; and
   each current limiter is configured to determine a current-limited reference for the phase based on the determined current reference for the phase.

7. The control system of claim 6, wherein the power converter comprises a current source inverter, and the control signal comprises the current-limited reference.

8. The control system of claim 6, wherein:

the power converter comprises a voltage source converter;

the control loop further comprises, for each of the plurality of phases, a voltage controller configured to receive the determined current-limited reference for the phase and determine a modulated voltage reference for the phase based on the received current-limited reference; and the control signal comprises the modulated voltage reference.

9. The control system of claim 1, wherein the GFM controller comprises, for each of the plurality of phases, a separate GFM controller.

10. The control system of claim 1, wherein the phasor determination unit comprises a state observer.

11. A method for controlling a power converter having a plurality of phases, comprising:

receiving, for each of the plurality of phases, a frequency reference for the phase;

determining, for each of the plurality of phases, an active power and a reactive power for the phase based on an electrical measurement for the phase and the frequency reference for the phase;

determining, for each of the plurality of phases, a voltage magnitude reference for the phase based on the reactive power for the phase and a voltage magnitude balancing feedback across the plurality of phases;

determining, for each of the plurality of phases, the frequency reference for the phase based on the active power for the phase and an angle balancing feedback across the plurality of phases; and determining, for each of the plurality of phases, a control signal for the power converter based on the determined voltage magnitude reference for the phase.

12. The method of claim 11, wherein the grid comprises three phases.

13. The method of claim 11, wherein:

determining the voltage magnitude reference for the phase based on the voltage magnitude balancing feedback comprises determining the voltage magnitude reference for the phase based on the voltage magnitude reference for each of the plurality of phases; and determining the frequency reference for the phase based on the angle balancing feedback comprises determining the frequency reference for the phase based on the frequency reference for each of the plurality of phases.

14. The method of claim 13, wherein the frequency reference for each phase is determined according to:

$$\frac{d}{dt}\delta_p = \omega_o - \sum_{l \in \mathcal{P} \backslash p} k_s(\delta_p - \delta_l) + m_P(P_p^* - P_p)$$

where $\delta_p$ is the deviation of the voltage phase angle reference $\theta_p$ for the respective phase, $m_P$ is the active power droop gain, $k_s$ is the phase balancing gain, $\mathcal{P}$ is the set of the plurality of phases, the subscript lower-case "p" refers to the phase being evaluated, $\omega_o$ is the nominal frequency, $$P_p^*$$

is the active power setpoint for the respective phase, and $P_p$ is the determined active power for the respective phase.

15. The method of claim 13, wherein the voltage magnitude reference for each phase is determined according to:

$$\tau \frac{d}{dt} V_p^{gfm} = -V_p^{gfm} + V^* - \sum_{l \in \mathcal{P} \backslash p} k_s(V_p^{gfm} - V_l^{gfm}) + m_Q(Q_p^* - Q_p)$$

where $$V_p^{gfm}$$

is the voltage magnitude reference for the respective phase, $m_Q$ is the reactive power droop gain, $k_s$ is the phase balancing gain, $\mathcal{P}$ is the set of the plurality of phases, the subscript lower-case "p" is the phase being evaluated, V* is the voltage setpoint, $$Q_p^*$$

is the reactive power setpoint for the respective phase, and $Q_p$ is the determined reactive power for the respective phase.

16. The method of claim 11, further comprising:

determining, by a voltage controller for each of the plurality of phases, a current reference for the phase based on the determined voltage magnitude reference for the phase; and determining, by a current limiter for each of the plurality of phases, a current-limited reference for the phase based on the determined current reference for the phase.

17. The method of claim 16, wherein the power converter comprises a current source inverter, and the control signal comprises the current-limited reference.

18. The method of claim 16, further comprising:

determining, by a voltage controller for each of the plurality of phases, a modulated voltage reference for the phase based on the current-limited reference for the phase, and wherein the power converter comprises a voltage source converter and the control signal comprises the modulated voltage reference.

19. The method of claim 11, wherein the active power and reactive power for a phase are determined according to a state observer.

20. The method of claim 11, wherein the voltage reference is determined at least 1000 time a second.

* * * * *